Aug. 29, 1950 P. O'RILEY 2,520,690
SAWING GUIDE ATTACHMENT FOR BAND SAWS
Filed Feb. 28, 1947
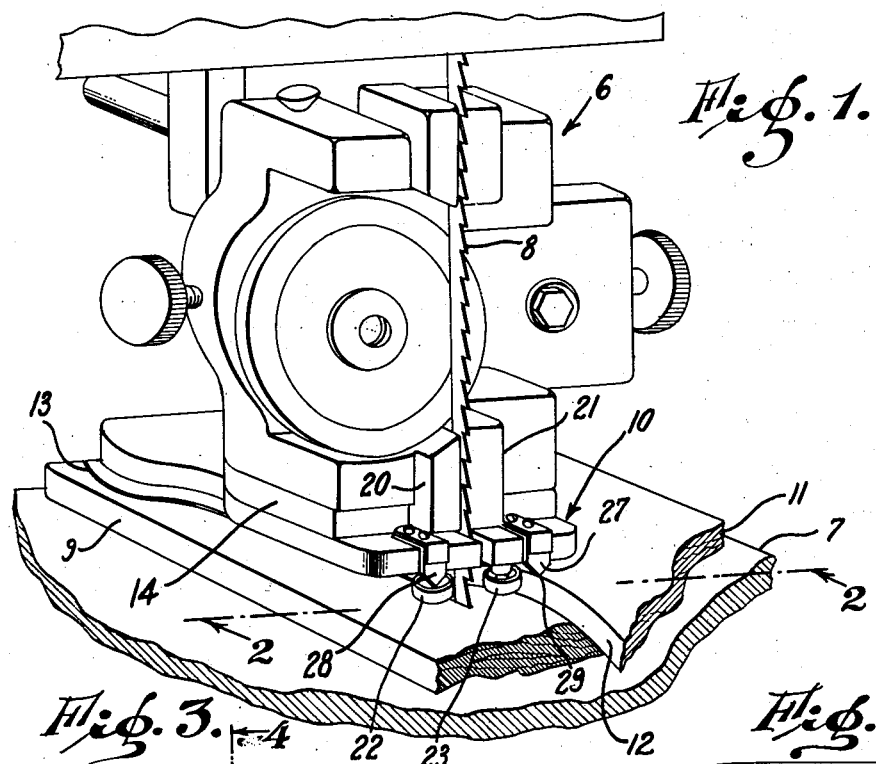
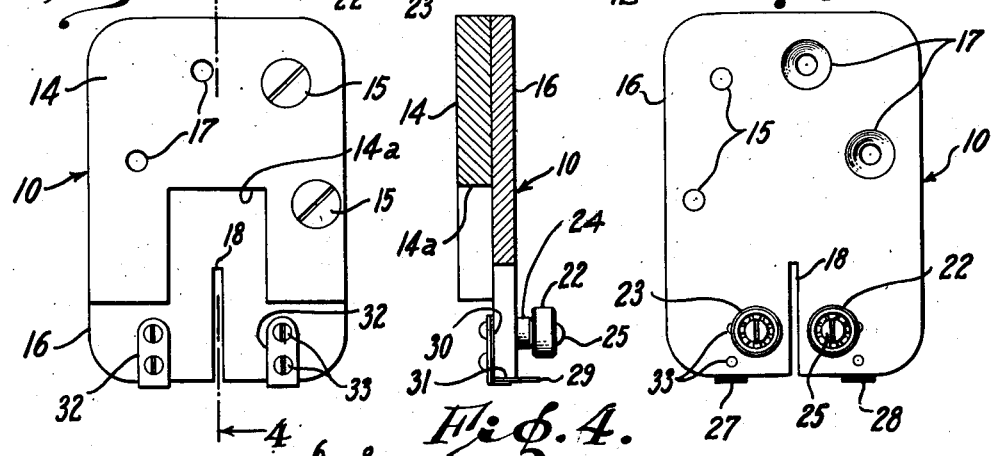
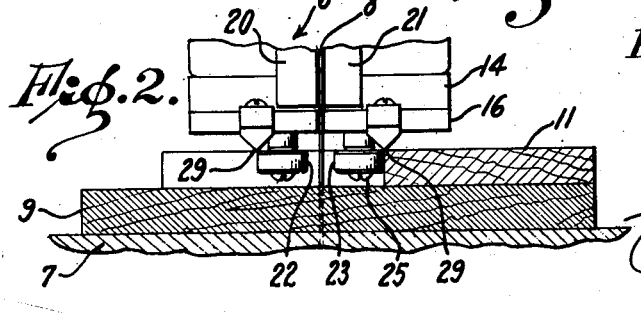
PATRICK O'RILEY,
INVENTOR.
BY
ATTORNEY Patented Aug. 29, 1950

2,520,690

UNITED STATES PATENT OFFICE 2,520,690

SAWING GUIDE ATTACHMENT FOR BAND SAWS

Patrick O'Riley, Los Angeles, Calif., assignor of one-half to Ralph M. Fitzgerald, Los Angeles, Calif.

Application February 28, 1947, Serial No. 731,603

7 Claims. (Cl. 143—157)

This invention relates to new and useful improvements in attachments for band saws.

An important object of the invention is to provide an attachment for band saws which may be secured to a conventional part of the machine by means of which the workman is enabled to make more accurate cuts in the material being sawed such as headers, nook ends, arches or other odd shaped pieces without the necessity of performing the extra operations of marking, planing and sanding and subsequently left there as a permanent fixture without interfering with the sawing operation of the saw for purposes other than that for which the attachment is primarily intended.

A further important object is to provide in connection with the saw attachment a tracer adapted to trace the upper line of the contoured edge of a template fixed to the work in advance of the guide roller manually held abuttingly against the face portion of such edge whereby the saw blade will with greater ease be maintained in parallelism with the contoured edge with less likelihood of the cutting edge of the saw making laterally jagged cuts in the work so that when the sawing operation is completed the finished work will have an unimpaired contour simulating that of the template edge patterned after.

A still further object of the invention is to provide a saw attachment provided with dual guiding means and dual tracing means adapted for use in the operation of sawing both right-hand and left-hand profiles in boards.

Also, an object of the invention is to provide in conjunction with a saw-guiding attachment a shim to aid in properly gaging the attachment in relation to a saw table in certain types of band saws.

Other general objects reside in providing an attachment for band saws which is easy to install, and which saves time and labor in that it does not have to be removed when once applied to the saw head.

With the foregoing and still other objects in view, the invention resides in the novel arrangement and combinations of parts and in the details of construction hereinafter described and claimed, it being understood that changes in the precise embodiment of the invention disclosed may be made without departing from the spirit of the invention.

Referring to the drawing wherein is shown a preferred embodiment of the invention as now reduced to practice and proven to be worthy of trade acceptance, Fig. 1 is a perspective view of the device applied to the head portion of a conventional saw structure.

Fig. 2 is a section taken on line 2—2 of Fig. 1.

Fig. 3 is a top plan view of the attachment per se.

Fig. 4 is a section taken on line 4—4 of Fig. 3.

Fig. 5 is a bottom plan view of the structure shown in Fig. 3.

Referring in detail to the drawing, in Fig. 1 is shown a band saw guide head 6 disposed superjacent to the table or bed plate 7 upon which the material to be sawed is supported, and a saw blade 8 mounted for vertical movement in said head to make cuts in material supported by said table. To those skilled in the art to which this invention pertains such parts are of common knowledge and being conventional require no further description except that incidentally entering into disclosing the invention.

The work 9 to be sawed rests flatly on the table 7 subjacent the attachment 10, soon to be described, the work 9 having superimposed thereon a template 11 which in order to prevent relative shifting may be clamped or temporarily nailed in any suitable manner to the work piece, said template having a side edge portion 12 contoured in a fashion which it is desired to duplicate as at 13 in the work piece.

In order to execute joining of the attachment 10 to the guide head for the particular band saw shown, I employ the use of a shim 14 to obviate making any change in the standard mechanism to which the attachment is applied. On types of saw frames other than that shown the shim 14 may be omitted and in order to accommodate the adaption of the attachment to all types of band saws in general the shim will be made either a part of the attachment as shown in Figs. 3 and 4 or else sold apart therefrom with the screws 15 included in the purchased package.

Now describing the attachment per se, in Figs. 3–5 I show a horizontally disposed substantially rectangularly shaped foot plate or block 16 streamlined by rounding all the corners. In the face portion of the plate which is the down face when installed I provide countersunk holes 17 which mate with tapped holes in the lower face of the head 6 to which the attachment is secured by means of flat head screws similar to the screws shown in Fig. 3, said screws 15 being adapted to secure the shim 14 to the plate 16 when its use is necessitated as aforesaid.

In the front edge portion of the plate 16 as viewed in Figs. 1, 3 and 5, which is the narrower side of the plate, I provide an open straight slot 18, said slot being cut rightangularly into one of its edges and located at the midwidth of the plate to receive the blade of the saw. The slot 18 is of sufficient length and breadth that when the attachment is fixed to the head 6 the saw blade will travel therein with a working fit the same as it does between the guides 20 and 21 superadjacent thereto. The shim is provided with a spacious open slot 14a to embrace said guides 20 and 21.

Juxtaposed to the right and left of the slot 18 so as to approximately aline with the saw blade in the operative position I provide a pair of work guide rollers 22 and 23, the roller 23 being adapted to abut the contoured edge 12 of the template 11 when the latter is at the right of the saw and the roller 22 being adapted to rollingly abut the contoured edge of the template when the latter occupies a position at the left of the saw blade.

The rollers are supported on studs 24 one end of which is tapped into the plate 16, said studs having reduced shank portions upon which the rollers are roller-bearingly mounted in a spaced relation to the plate, said rollers each being held in their rotative positions by means of a screw 25 screwed into the end of the shank.

In order for the workman to feed the saw into the work in such a manner that when the sawing operation has been performed the cut 13 will be an exact duplicate of the contoured edge 12 and there will be no necessity for smoothing the newly cut edge, there is provided for both right and left hand sawing of boards a pair of indicators or tracers 27 and 28, tracer 27 traversing the upper line of the profile as shown in Fig. 1 while the roller 23 rollingly abuts the vertically disposed edge 12 of which said upper line forms the upper boundary.

The tracers 27 and 28 consist of L-shaped flexible material, one end of which is pointed and directed downwardly as at 29 in Fig. 2, the arrowed portion only of each tracer extending below the bottom face of the attachment when they are applied in the manner shown in the several figures. Said tracers have basal portions 30 and the arrowed portions 31 depend rightangularly from the basal portions so that in the applied position each basal portion 30 overlies the upper face of the plate 16 and the arrowed portion 31 overlies the front edge portion of such plate.

A right angled clip 32 is provided to secure each tracer to the block 16, the longer limb of the clip overlying the basal portion of the tracer and the shorter limb of the clip extending down over the arrowed limb to a point about half way the thickness of the plate 16, pairs of screws 35 being tapped into the plate 16 to secure the tracers 27 and 28 in their operative positions.

In operation all that is necessary is to place the template 11 upon the material 9 to be sewed and then maintain the template edge 12 against the guide roller 23 or 22 and in line with the point of the arrow 27 or 28 during the sawing operation, in such position of the parts the slot through which the saw passes, the side of the roller which is farthest away from the slot and the point of the arrow having a three-point relationship wherein such side of the roller and arrow point are equidistant from the side of said slot.

I claim:

1. An attachment for band saws comprising a substantially rectangular plate having a straight slot cut rightangularly into one of its edges to receive the blade of the saw, a roller, mounting means carried by said plate and turnably supporting said roller in a spaced relation to one face of said plate adjacent one side of said slot and near that edge of said plate from which said slot extends so that said roller turns in a plane parallel to said plate, and a tracer mounted on the opposite face of said plate and having an indicating point overhanging the aforesaid slotted side of the plate in a position to travel along a work guiding edge of a template attached in an overlying relation to a piece of work slightly in advance of said roller, said roller being positioned to have rolling contact with said work guiding edge, said indicating point and the point in the periphery of the roller which is farthest from said slot being equidistant from the side of said slot.

2. An attachment for band saws comprising a plate having a slot opening out at one side edge thereof, a roller dependingly mounted upon the flat face of said plate in the corner portion formed by said slot and such edge so as to rotate in a plane parallel to such face, and a tracer mounted on said plate and having an arrowed portion pointing in the direction in which said roller depends from said plate, the point of said arrowed portion and the side of the roller which is farthest from said slot being equidistant from the side edge of said slot.

3. The combination with a template superimposed upon a work piece, said template being provided with a profiled edge which it is desired to reproduce by a band saw operation performed on said work piece, of means attachable to the head of said band saw having a slot therein through which the saw passes for performing the work on said work piece, roller means carried by said attaching means and rollingly engaging said profiled edge by manually pressing said profiled edge thereagainst, while the saw is reproducing a cut in the work simulating the profiled edge of the template, and a tracer carried by said means in advance of said roller means for traversing the boundary line of said profiled edge while the edge of said roller is maintained in rolling contact with the face portion of said profiled edge.

4. An attachment for band saws comprising a flat, substantially rectangular plate having a straight slot cut rightangularly into one side edge thereof, a roller dependingly mounted upon one of the faces of said plate in each adjacent corner portion formed by said slot and such edge so that said rollers each rotate in a plane parallel to such face, and a tracer carried by said plate on each side of said slot and provided with a pointed portion pointing in the direction in which said rollers depend from said plate, the tips of said pointed portions and the peripheral portions of said rollers which are farthest from said slot being each equidistant from said slot.

5. A roller mounted on the underside of the head of a band saw superjacent the bed plate on which the work is sawed by a saw guided between guides carried by said head, said roller rollingly contacting the vertical face of a profiled edge of a template temporarily secured to the piece of work on which the saw is to saw a duplicate profile as said profiled edge is manually maintained against the peripheral portion of said roller, and a tracer carried by said head for tracing the outline of the template profile as the roller is maintained in rolling contact therewith.

6. An attachment for band saws comprising a horizontally disposed substantially rectangular foot plate attachable to the underside of a band saw guide head, said plate having a straight slot cut rightangularly into one of its edges to receive the blade of the saw, a work guide roller carried by said plate in a subjacent relation thereto to rotate in a horizontal plane, said roller being adjacent to the angle in said plate defined by said slot and that edge of the plate from which said slot extends, said roller being positioned to have a rolling contact with the work guiding edge of a template attached in an overlying relation to the work, and a pointed indicator carried by said plate in a position to travel along said work guiding edge of said template slightly in advance of said roller.

7. The subject matter of claim 6, and said indicator being L-shaped with one limb overlying and attached to the upper face of said plate, the other limb of said indicator being pointed and overhanging the edge of said plate from which said slot extends, the latter limb being flexible so as to yield without being injured when contacted by said template.

PATRICK O'RILEY.

REFERENCES CITED

The following references are of record in the file of this patent:

UNITED STATES PATENTS

| Number  | Name       | Date          |
|---------|------------|---------------|
| 313,025 | Rowlett    | Feb. 24, 1885 |
| 361,979 | Ballew     | Apr. 26, 1887 |
| 373,686 | Schloer    | Nov. 22, 1887 |
| 706,488 | Crapp      | Aug. 5, 1902  |
| 964,846 | Brueggemann| July 19, 1910 |